(12) United States Patent
Nakamura

(10) Patent No.: US 9,141,890 B2
(45) Date of Patent: Sep. 22, 2015

(54) DATA PROCESSING APPARATUS, DATA PROCESSING METHOD, DATA PROCESSING PROGRAM FOR IMPLEMENTING THE METHOD, AND IMAGE PROCESSING APPARATUS

(71) Applicant: CANON KABUSHIKI KAISHA, Tokyo (JP)

(72) Inventor: Tadahiro Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 392 days.

(21) Appl. No.: 13/940,488

(22) Filed: Jul. 12, 2013

(65) Prior Publication Data

US 2013/0301072 A1 Nov. 14, 2013

Related U.S. Application Data

(63) Continuation of application No. 10/886,924, filed on Jul. 8, 2004, now Pat. No. 8,510,444.

(30) Foreign Application Priority Data

Jul. 15, 2003 (JP) .................................. 2003-197295

(51) Int. Cl.
*G06F 15/173* (2006.01)
*G03G 15/00* (2006.01)
(Continued)

(52) U.S. Cl.
CPC .......... *G06K 15/1806* (2013.01); *G06F 3/1204* (2013.01); *G06F 3/1246* (2013.01); *G06F 3/1247* (2013.01); *G06F 3/1286* (2013.01); *G06F 3/1288* (2013.01)

(58) Field of Classification Search
CPC .................................................... G06F 3/1246
USPC .......................................... 709/226; 399/80
See application file for complete search history.

(56) References Cited

U.S. PATENT DOCUMENTS 6,003,078 A 12/1999 Kodimer et al.
6,636,903 B2 10/2003 Endoh et al.
(Continued)

FOREIGN PATENT DOCUMENTS

EP 1193947 A2 8/2001
EP 1193948 A2 8/2001
(Continued)

OTHER PUBLICATIONS

Tadashi, et al., "Complete Guide to Web Service Establishment"; Nikkei Linux Magazine; Dec. 2001, pp. 77-85, Nikkei Business Publications, Inc.
(Continued)

*Primary Examiner* — Asghar Bilgrami
(74) *Attorney, Agent, or Firm* — Rossi, Kimms & McDowell LLP

(57) ABSTRACT

A data processing apparatus that enables a client to identify services which can be provided under a current status of the data processing apparatus by reflecting dynamically changing status information, such as equipment information, in a WSDL file. An equipment information acquisition device 1211 acquires status information relating to the status of an image processing apparatus 100. A WSDL generator 1212 generates service description information containing information pertaining to at least one service provided by the image processing apparatus 100 and described in a predetermined language, in accordance with the status information acquired by the equipment information acquisition device 1211. The service description information is referred to by a host computer 200 to use the at least one service. A Web server 1213 transmits the service description information generated by the WSDL generator 1212 to the host computer 200.

38 Claims, 17 Drawing Sheets

(51) Int. Cl.
 *G06K 15/02* (2006.01)
 *G06F 3/12* (2006.01)

(56) References Cited

U.S. PATENT DOCUMENTS

| | | |
|---|---|---|
| 7,151,966 B1 | 12/2006 | Baier et al. |
| 2001/0030755 A1 | 10/2001 | Yamade |
| 2002/0046239 A1 | 4/2002 | Stawikowski et al. |
| 2002/0161990 A1 | 10/2002 | Zhang et al. |
| 2002/0174178 A1 | 11/2002 | Stawikowski |

FOREIGN PATENT DOCUMENTS

| | | |
|---|---|---|
| JP | 2000-137590 A | 5/2000 |
| JP | 2001-260492 A | 9/2001 |
| JP | 2002-157174 A | 5/2002 |
| JP | 2002-215486 A | 8/2002 |
| JP | 2003-076524 A | 3/2003 |
| JP | 2003-076542 A | 3/2003 |

OTHER PUBLICATIONS

Masunori, Iwamura, "Must-See IT Engineers", NetSpot from Canon, Inc., Back Office Magazine vol. 2, CQ Publishing Co., Ltd., Mar. 1, 1998, pp. 150-153.

FIG. 6

```
<?xml version="1.0"?>
<definitions name="PrintService"
targetNamespace="http://www.xxxxx.co.jp/PrintService"
    xmlns:tns="http://www.xxxxx.co.jp/PrintService"
    xmlns:xsd="http://www.w3.org/1999/XMLSchema"
    xmlns:soap="http://schemas.xmlsoap.org/wsdl/soap/"
    xmlns="http://schemas.xmlsoap.org/wsdl/">

<types>
  <xsd:schema targetNamespace="http://www.xxxxx.co.jp/PrintService"
   xmlns="http://www.w3.org/1999/XMLSchema">
  <complexType name="PrintJobRequest">
    <sequence>
      <element name="jobname" type="string"/>
      <element name="owner" type="string"/>
         . . .
      <element name="duplex" type="tns:Duplex"/>
         . . .
    </sequence>
  </complexType>
     . . .
  <simpleType name="Duplex">
    <restriction base="string">
      <enumeration value="OneSided"/>
      <enumeration value="TwoSidedLongEdge"/>       }606
      <enumeration value="TwoSidedShortEdge"/>
    </restriction>
  </simpleType>
     . . .
  <complexType name="PauseJobRequest">
    <sequence>
      <element name="jobid" type="int">
      <element name="time" type="int">              }607a
    </sequence>
  </complexType>
     . . .
</types>
```
} 601 continued

FIG. 8

```
<binding name="PrintServiceBinding" type="tns:PrintService">
  <soap:binding style="rpc"
    transport="http://schemas.xmlsoap.org/soap/http"/>
  <operation name="PrintJob">
    <soap:operation soapAction="http://urn:printservice"/>
    <input>
      <soap:body
        encodingStyle="http://schemas.xmlsoap.org/soap/encoding/"
        namespace="urn:printservice" use="encoded"/>
    </input>
    <output>
      <soap:body
        encodingStyle="http://schemas.xmlsoap.org/soap/encoding/"
        namespace="urn:printservice" use="encoded"/>
    </output>
  </operation>
  <operation name="PauseJob">
    <soap:operation soapAction="http://urn:printservice"/>
    <input>
      <soap:body
        encodingStyle="http://schemas.xmlsoap.org/soap/encoding/"
        namespace="urn:printservice" use="encoded"/>
    </input>
    <output>
      <soap:body
        encodingStyle="http://schemas.xmlsoap.org/soap/encoding/"
        namespace="urn:printservice" use="encoded"/>
    </output>
  </operation>
  . . .
</binding>

<service name="PrintService">
  <documentation> xxxxx print service</documentation>
  <port name="PrintServicePort" binding="tns:PrintServiceBinding">
    <soap:address location="http://www.xxxxx.co.jp/PrintService"/>
  </port>
</service>
</definitions>
```

604 (binding block including PrintJob and PauseJob operations)
607d (PauseJob operation)
605 (service block)

FIG. 10

```
M-SEARCH * HTTP/1.1
Host:239.255.250:1900
MAN:"ssdp:discover"
MX:5
ST:um:schemas-bmlinks-jp:service:print:1
RID:uuid:7d0f2c0f-f53d-4353-a2d2-e2c0e5bc798c
```

FIG. 11

```
HTTP/1.1 200 OK
Cache-control:max-age=1800
Date:Wed,06 Dec 2000 20:08:37 GMT
Location: http://192.168.0.1/mywsdl.wsdl
RID:uuid:7d0f2c0f-f53d-4353-a2d2-e2c0e5bc798c
```

FIG. 13

```
<deviceList>
  <device>
    <id>1</id>
    <name>XXXXX Printer</name>
    <location>XXXXX Office</location>
    <wsdl>http://192.168.0.100/wsdl/device1.wsdl</wsdl>
  </device>
  <device>
    <id>2</id>
    <name>XXXXX MFP</name>
    <location>XXXXX Office</location>
    <wsdl>http://192.168.0.100/wsdl/device2.wsdl</wsdl>
  </device>
</deviceList>
```

*FIG. 15*

| Operation | PrintJob | PauseJob |
|---|---|---|
| Argument | jobname(string)<br>owner(string)<br>duplex(Duplex:<br>   OneSided,<br>   TwoSidedLongEdge,<br>   TwoSidedShortEdge)<br>⋮ | jobid(int)<br>time(int) |

DATA PROCESSING APPARATUS, DATA PROCESSING METHOD, DATA PROCESSING PROGRAM FOR IMPLEMENTING THE METHOD, AND IMAGE PROCESSING APPARATUS

CROSS REFERENCE TO RELATED APPLICATION

This application is a continuation of U.S. patent application Ser. No. 10/886,924, filed Jul. 8, 2004, which claims priority from Japanese Patent Application No. 2003-197295 filed Jul. 15, 2003, both of these prior applications of which are hereby incorporated herein by reference in their respective entireties.

BACKGROUND OF THE INVENTION

1. Field of the Invention

The present invention relates to a data processing apparatus capable of communicating with external information processing apparatuses, a data processing method, a data processing program for implementing the method, and an image processing apparatus.

2. Description of the Related Art

Conventionally, an information processing apparatus, such as a host computer or a personal computer, has been able to obtain printer-related attribute information from a printer, determine whether or not a job can be issued based on the attribute information, and control the issuance of the job based on results of the determination (for example, Japanese Laid-Open Patent Publication (Kokai) No. 2000-137590).

At the printer, an ID is added to each of a variety of types of attribute information, and the information processing apparatus acquires and identifies the attribute information based on these IDs.

In recent years, on the Internet, web services have attracted much attention. A web service is a technology that seamlessly joins a variety of services that are dispersed on a network. Using this technology, it is possible for a program to dynamically select appropriate services without any human intervention, and as such it is widely anticipated by many industries as a technology that is capable of automatically performing a desired processing.

The data exchanged through a web service is written in XML (Extensible Markup Language). The XML data is transmitted over the network using SOAP (Simple Object Access Protocol). According to SOAP, it is stipulated that HTTP (Hyper Text Transfer Protocol) or SMTP (Simple Mail Transfer Protocol) is used in a lower layer, and SOAP can be used on the Internet as easily as web browsing and an e-mail.

Moreover, technical specifications used by web services include WSDL (Web Service Description Language). WSDL is a web service description language that describes an interface for accessing a web service. A client information processing apparatus (hereinafter "client") that uses a web service can confirm the actual connection method by referring to information described in WSDL. WSDL is standardized by W3C (World Wide Web Consortium), the technical specifications for which can be obtained from "http://www.w3.org/TR/wsdl".

By applying the web service technology to printing, a variety of hitherto unavailable advantages can be obtained. For example, with a conventional printer, the client must identify which ID corresponds to which attribute information and acquire desired attribute information by specifying a plurality of IDs. By contrast, a printer equipped with a web service enables a user to flexibly customize access to the printer print service. For example, the connection method to the printer print service is described in WSDL. Therefore, by using a conversion/interpretation program following uniform standards based on WSDL, the client can also interpret a file described in WSDL and provide a GUI (graphical user interface) has only those items required by the user, which are extracted from the file.

Moreover, WSDL can also describe job information that can be specified when a print job is input, so that, for example, it is also possible to know in advance whether or not double-sided printing is possible by referring to the WSDL-described job information.

Thus, it is expected that printers, to which the web service technology having a variety of advantages is applied, will be further developed from now onwards.

In order to apply the web service technology described above to printing, the printer itself is required to generate a WSDL-described file (hereinafter referred to as "WSDL file") and publish it on the network. However, if the WSDL file is unique to each printer, information that dynamically changes, such as status information including equipment information (installed hardware information) on the printer, cannot be reflected in the WSDL file.

Therefore, for example, in a WSDL file of a printer for which a hard disk is optional and that is shipped without a hard disk, "no hard disk" is written. Similarly, if, considering the fact that a hard disk is optional, information that is necessary to use a hard disk is written in the WSDL file, then the client will carry out operations required when the printer uses a hard disk, regardless of whether or not a hard disk is installed.

As a result, there is the drawback that the client transmits operations that cannot actually be executed, to the printer.

SUMMARY OF THE INVENTION

It is an object of the present invention to provide a data processing apparatus, a data processing method, a data processing program for implementing the method, and an information processing apparatus, that enable a client to identify services which can be provided under a current status of the data processing apparatus by reflecting dynamically changing status information, such as equipment information, in a WSDL file.

To attain the above object, in a first aspect of the present invention, there is provided a data processing apparatus capable of communicating with at least one external information processing apparatus, comprising an acquisition device that acquires status information relating to a status of the data processing apparatus, a generating device that generates service description information containing information pertaining to at least one service provided by the data processing apparatus and described in a predetermined language, in accordance with the status information acquired by the acquisition device, the service description information being referred to by the external information processing apparatus to use the at least one service, and a transmitting device that transmits the service description information generated by the generating device to the information processing apparatus.

According to the first aspect of the present invention, the data processing apparatus generates service description information in accordance with its own status, and therefore the client can identify services which can be provided under the current status of the data processing apparatus.

Preferably, the service description language is described in a format conforming to WSDL (Web Service Description Language).

Preferably, the status information includes equipment information pertaining to equipment installed in the data processing apparatus, and the generating device generates the service description information in accordance with the equipment installed in the data processing apparatus.

Also preferably, to use the at least one service provided by the data processing apparatus, the information processing apparatus analyzes the service description information transmitted by the transmitting device and identifies, based upon results of the analysis, at least one operation that the data processing apparatus can carry out in a current status thereof and at least one argument that can be designated by the at least one operation.

Also preferably, the service description information is generated in timing selected from the group consisting of timing corresponding to activation of the data processing apparatus, timing corresponding to every lapse of a predetermined period of time, and timing corresponding to every occurrence of an event in which the equipment information is changed.

Also preferably, the at least one information processing apparatus includes a server, and another type of information processing apparatus, and the transmitting device transmits the service description information generated by the generating device to the server to register the service description information in the server, and the other type of information processing apparatus transmits a request for the service description information to the server, to use the at least one service provided by the data processing apparatus.

To attain the above object, in a second aspect of the present invention, there is provided an image processing apparatus capable of communicating with at least one external information processing apparatus, comprising an acquisition device that acquires status information relating to a status of the image processing apparatus, a generating device that generates service description information containing information pertaining to at least one service provided by the image processing apparatus and described in XML in a format conforming to WSDL, in accordance with the status information acquired by the acquisition device, the service description information being referred to by the external information processing apparatus to use the at least one service, and a transmitting device that transmits the service description information generated by the generating device to the information processing apparatus.

To attain the above object, in a third aspect of the present invention, there is provided a data processing method applied to a data processing apparatus capable of communicating with at least one external information processing apparatus, comprising an acquisition step of acquiring status information relating to a status of the data processing apparatus, a generating step of generating service description information containing information pertaining to at least one service provided by the data processing apparatus and described in a predetermined language, in accordance with the status information acquired in the acquisition step, the service description information being referred to by the external information processing apparatus to use the at least one service, and a transmitting step of transmitting the service description information generated in the generating step to the information processing apparatus.

To attain the above object, in a fourth aspect of the present invention, there is provided a data processing program for causing a computer to execute a data processing method applied to a data processing apparatus capable of communicating with at least one external information processing apparatus, comprising an acquisition module for acquiring status information relating to a status of the data processing apparatus, a generating module for generating service description information containing information pertaining to at least one service provided by the data processing apparatus and described in a predetermined language, in accordance with the status information acquired by the acquisition module, the service description information being referred to by the external information processing apparatus to use the at least one service, and a transmitting module for transmitting the service description information generated by the generating module to the information processing apparatus.

To attain the above object, in a fifth aspect of the present invention, there is provided a data processing method applied to a data processing system in which a data processing apparatus and an information processing apparatus are capable of communicating with each other, comprising a generating step of generating service description information containing information pertaining to at least one service provided by the data processing apparatus and described in a predetermined language, in accordance with the status information acquired in the acquisition step, the service description information being referred to by the information processing apparatus to use the at least one service, a transmitting step of transmitting the service description information generated in the generating step to the information processing apparatus, a reception step of receiving the service description information transmitted in the transmission step, and an identification step of identifying information pertaining to at least one services capable of being provided by the data processing apparatus by analyzing the service description information in the reception step.

The above and other objects, features and advantages of the invention will become more apparent from the following detailed description taken in conjunction with the accompanying drawings.

BRIEF DESCRIPTION OF THE DRAWINGS

FIG. 6 is a diagram showing a first portion of the WSDL file generated in the step S403 in FIG. 4;

FIG. 8 is a diagram showing a portion of the WSDL file succeeding the portion of the WSDL file shown in FIG. 7;

FIG. 10 is a diagram showing an example of a search packet transmitted in the case shown in FIG. 9;

FIG. 11 is a diagram showing an example of a search response packet transmitted in the case shown in FIG. 9;

FIG. 13 is a diagram showing an example of a device list that a server appearing in FIG. 1 creates;

FIG. 15 is a diagram showing an example of operation list information obtained as a result of the WSDL analysis process in FIG. 14;

DETAILED DESCRIPTION OF THE PREFERRED EMBODIMENTS

The present invention now will be described in detail below with reference to the drawings showing a preferred embodiment thereof.

Figure 1:
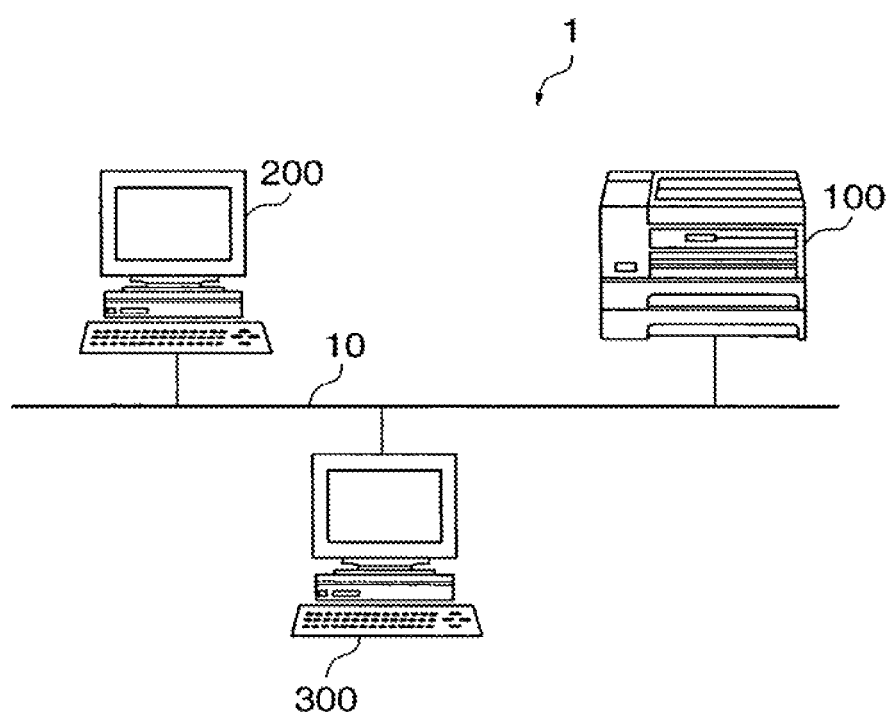
FIG. 1 is a block diagram schematically showing the configuration of a printing system comprised of a data processing apparatus according to an embodiment of the present invention.

FIG. 1 is a block diagram schematically showing the configuration of a printing system comprised of a data processing apparatus according to an embodiment of the present invention.

In the printing system 1, an image processing apparatus 100 (data processing apparatus), a host computer 200 (information processing apparatus) and a server 300 (information processing apparatus) are connected to each other via a network 10. The image processing apparatus 100 is implemented by a laser beam printer, for example, and can communicate with the host computer 200 and the server 300. The image processing apparatus 100 receives print jobs from the host computer 200 and carries out printing. In addition, the image processing apparatus 100 generates a WSDL (Web Service Description Language)-described file (hereinafter referred to as "WSDL file") based on its own installed hardware information (equipment information) and publishes the generated WSDL file on the network 10.

There are two methods of publishing. If the image processing apparatus 100 itself has a WSDL file, the published WSDL file can be referred to by the host computer 200 and the server 300. Also, the WSDL file that the image processing apparatus 100 generates can be registered with the server 300, and the server 300 can publish the WSDL file instead of the image processing apparatus 100. In the latter case, the host computer 200 acquires the WSDL file of the image processing apparatus 100 from the server 300.

Figure 2:
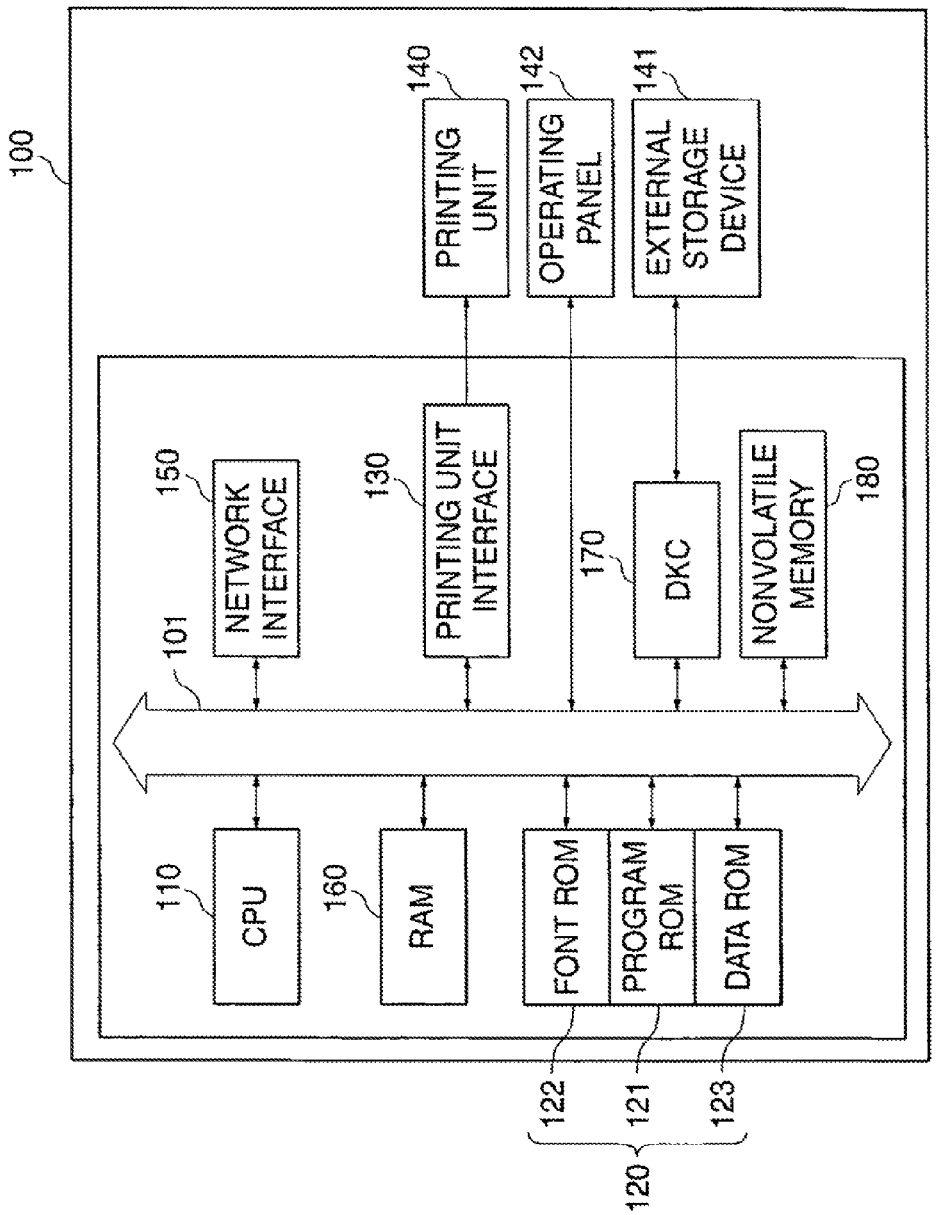
FIG. 2 is a block diagram showing the configuration of the image processing apparatus in FIG. 1.

FIG. 2 is a block diagram showing the configuration of the image processing apparatus in FIG. 1.

The following description is given on the assumption that a laser beam printer is used as an example of the image processing apparatus 100.

In FIG. 2, reference numeral 110 designates a printer CPU (hereinafter referred to as "CPU 110"). Based on control programs stored in a program ROM 121 in a ROM 120, the CPU 110 comprehensively controls access to various devices connected to a system bus 101 and outputs image signals as output information to a printing unit (printer engine) 140 connected via a printing unit interface 130.

Moreover, the program ROM 121 in the ROM 120 stores programs that the CPU 110 can execute. Further, a font ROM 122 in the ROM 120 stores font data (including outline font data) which is used when generating the output information described above, and a data ROM 123 in the ROM 120 stores information which is used on the host computer 200.

The CPU 110 can communicate with the host computer 200 on the network 10 through a network interface 150.

A RAM 160 functions mainly as a main memory and a work area for the CPU 110, and is configured such that the memory capacity can be expanded by an optional RAM connected to an expansion port, not shown. It should be noted that the RAM 160 is used as an output information expanding area, an environment data storage area and the like.

Access to an external storage device 141, such as a hard disk (HD) or an IC card, is controlled by a disk controller (DKC) 170. The hard disk is connected as an option, and stores font data, emulation programs, form data and the like, and is used as a job storage area onto which print jobs are temporarily spooled and which is accessed to control the spooled jobs externally. An operating panel 142 enables a user to input a variety of information using software keys.

One or more external storage devices 141 are provided, and the image processing apparatus 100 may be configured such that an optional font (in addition to the built-in fonts) card or a plurality of external memories storing programs that interpret printer control languages of different language types can be connected. A nonvolatile memory 180 stores printer mode setting information from the operating panel 142 separately by user and by group.

Moreover, the image processing apparatus 100 can accommodate a variety of other expansion devices, such as a finisher 191 that performs functions such as stapling and sorting (see FIG. 3), a duplex processor 192 (see FIG. 3) for implementing double-sided printing, whose operations are controlled by the CPU 110.

Figure 3:
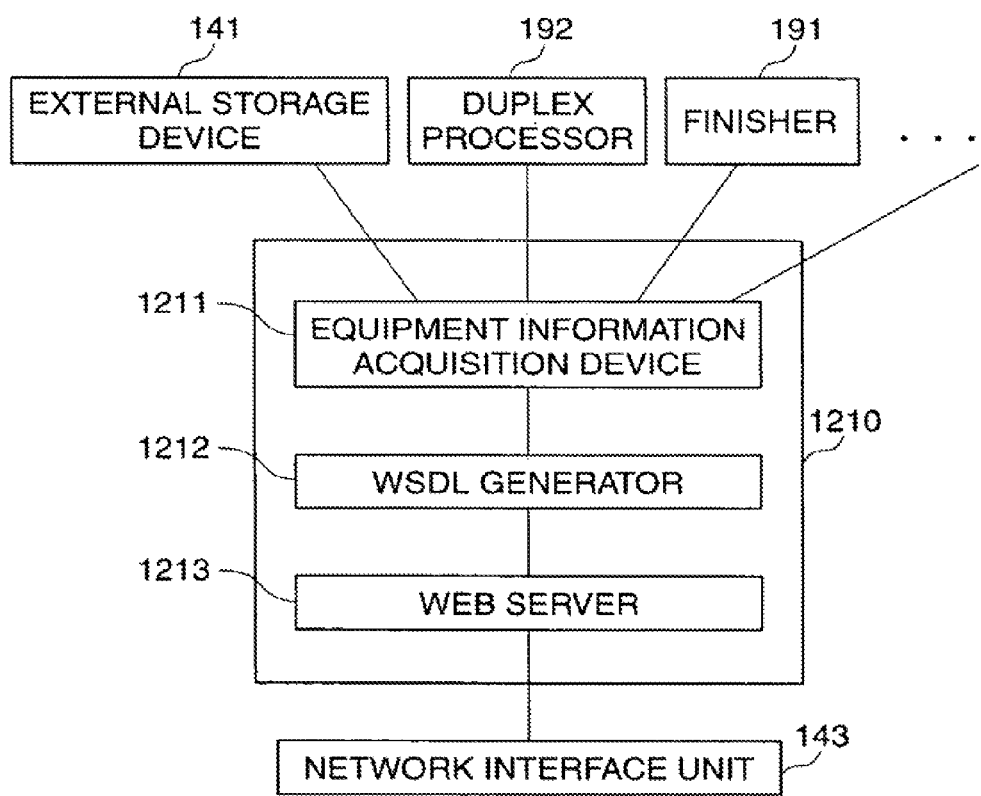
FIG. 3 is a block diagram showing peripheral devices and software blocks of programs executed by a CPU appearing in FIG. 2.

FIG. 3 is a block diagram showing peripheral devices and software blocks of programs executed by the CPU 110 in FIG. 2.

A program 1210 is stored on the program ROM 121, and is comprised of an equipment information acquisition device 1211, a WSDL generator 1212 and a Web server 1213. The equipment information acquisition device 1211 communicates with various devices such as the external storage device 141, the finisher 191 and the duplex processor 192 described above that are installed in the image processing apparatus 100 as options, and acquires equipment information, for example, information on presence or absence of these devices as well as detailed information thereof. Moreover, the equipment information acquisition device 1211 can also acquire status information concerning a variety of printer statuses in addition to the equipment information.

The WSDL generator 1212, as described later, communicates with the equipment information acquisition device 1211 and generates a WSDL file for the image processing apparatus 100. The Web server 1213 publishes the generated WSDL file on the network 10 through a network interface 143, and transmits the WSDL file in response to a request for receiving the WSDL file from a remote device using the HTTP protocol.

Figure 4:
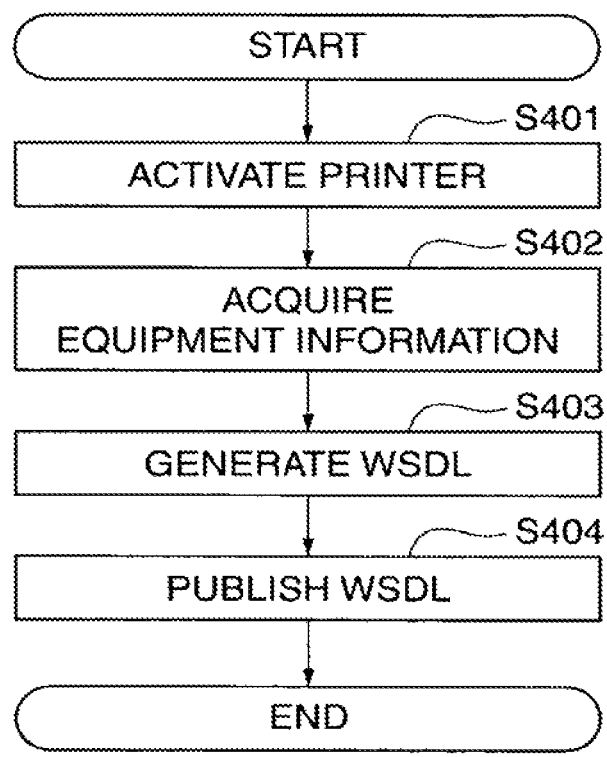
FIG. 4 is a flow chart showing a process carried out by a WSDL generator appearing in FIG. 3 when generating a WSDL file.

FIG. 4 is a flow chart showing a process carried out by the WSDL generator 1212 in FIG. 3 when generating a WSDL file.

First, when power is supplied to the image processing apparatus 100 and the relevant program is activated in a step S401, the process proceeds to a step S402, wherein the equipment information acquisition device 1211 acquires equipment information, for example, information on the presence or absence of option devices such as the external storage device 141 and the duplex processor 192 as well as detailed information thereof, and transmits the information to the WSDL generator 1212. In a step S403, the WSDL generator 1212 generates a WSDL file based on the equipment information, as in an example described below, and transmits the generated WSDL file to the Web server 1213. Thereafter, in a step S404, the Web server 1213 publishes the generated WSDL file on the network 10.

Figure 5:
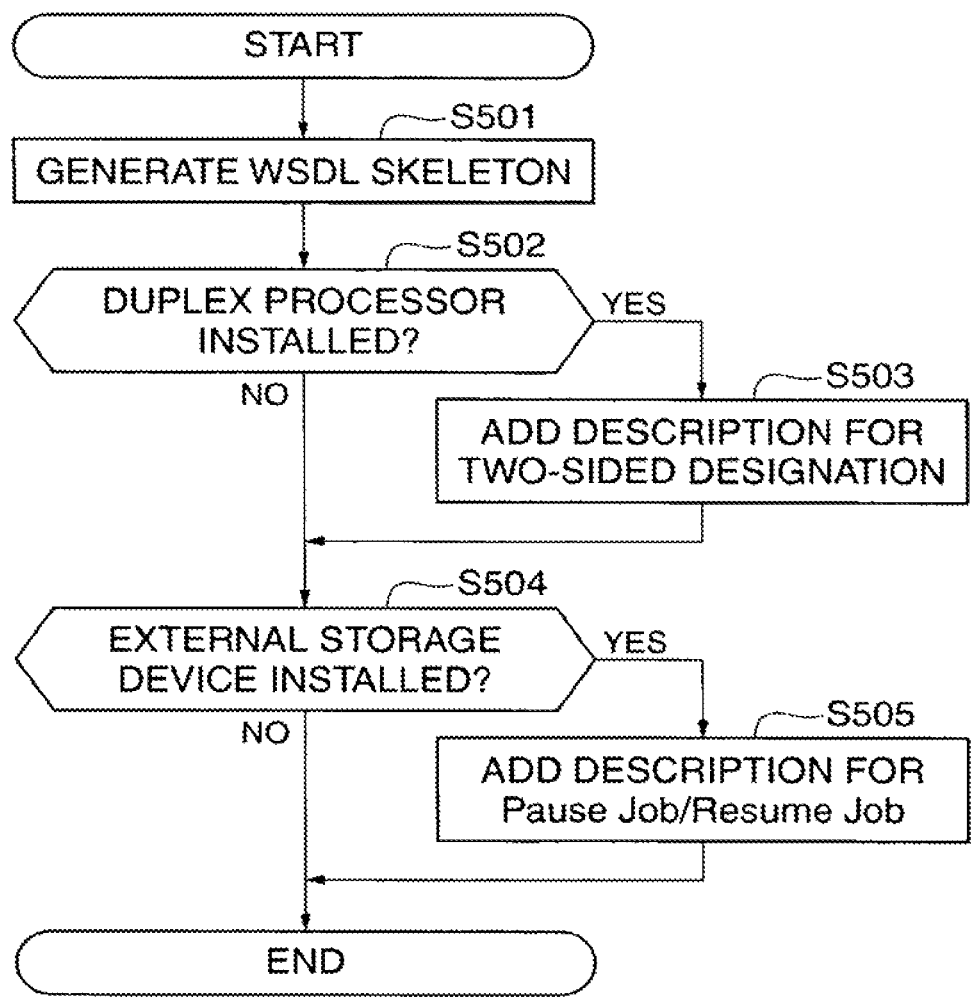
FIG. 5 is a flow chart showing details of a process for generating the WSDL file, executed a step S403 in the flow chart in FIG. 4.
Figure 7:
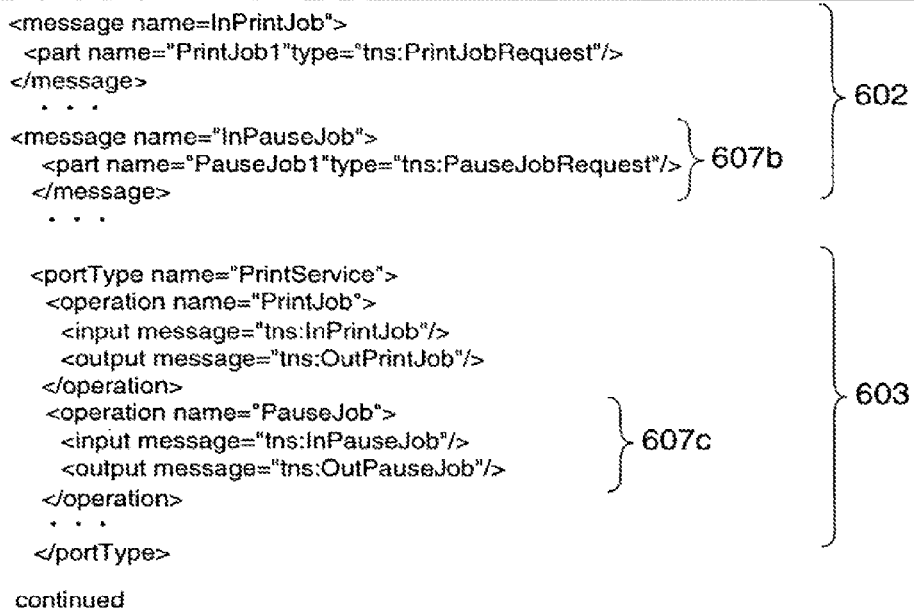
FIG. 7 is a diagram showing a portion of the WSDL file succeeding the portion of the WSDL file shown in FIG. 6.

FIG. 5 is a flow chart showing details of the process for generating the WSDL file, executed in the step S403 in the flow chart in FIG. 4. FIGS. 6 to 8 are diagrams showing an example of the WSDL generated in the step S403 in FIG. 4.

The WSDL file is shown continuously from FIG. 6 to FIG. 8 in the order shown. It should be noted that the algorithm for generating the WSDL file can be customized in various ways, and thus what is shown here is but one example.

As shown in FIGS. 6 to 8, the WSDL file is comprised of a types part 601, a message part 602, a portType part 603, a binding part 604 and a service part 605.

As shown in FIG. 5, first, in a step S501, a skeleton which forms the base of the WSDL file is generated. The skeleton is descriptions of operations that can be used in the event that absolutely no optional devices are installed, and includes a description of a PrintJob operation indicating that input of a simple job is possible.

Next, in a step S502, it is determined whether or not the duplex processor 192 is installed. If it is determined that the duplex processor 192 is installed, then the client can designate double-sided printing when executing the PrintJob operation, and hence, in a step S503 a description 606 indicating that long edge binding and short edge binding are possible is added to the types part 601.

Next, in a step S504, it is determined whether or not the external storage device 141 is installed. If it is determined that the external storage device 141 is installed, then the client can execute a PauseJob/ResumeJob operation for pausing/resuming a job spooled onto the external storage device 141, in addition to the PrintJob operation. Therefore, in a step S505, PauseJob/ResumeJob descriptions 607*a*, 607*b*, 607*c* and 607*d* are added to the types part 601, the message part 602, the portType part 603 and the binding part 604, respectively. An example of a ResumeJob description is omitted from FIG. 6.

Thus, as described above, the image processing apparatus 100 can generate a WSDL file based on the current status. In FIG. 5, the presence of currently installed equipment is checked as the current status. However, it is also possible to generate a WSDL file based on a current error occurrence status. For example, in the case where the image processing apparatus 100 can process not only print operations but also scan operations, in a normal state a WSDL file is generated that indicates that print operations and scan operations, respectively, can be carried out. However, in the event that a paper jam has occurred, then a WSDL file is generated indicating that only scan operations can be carried out.

Next, a description will be given of a method in which the host computer 200 acquires and uses a WSDL file generated by the image processing apparatus 100.

Figure 9:
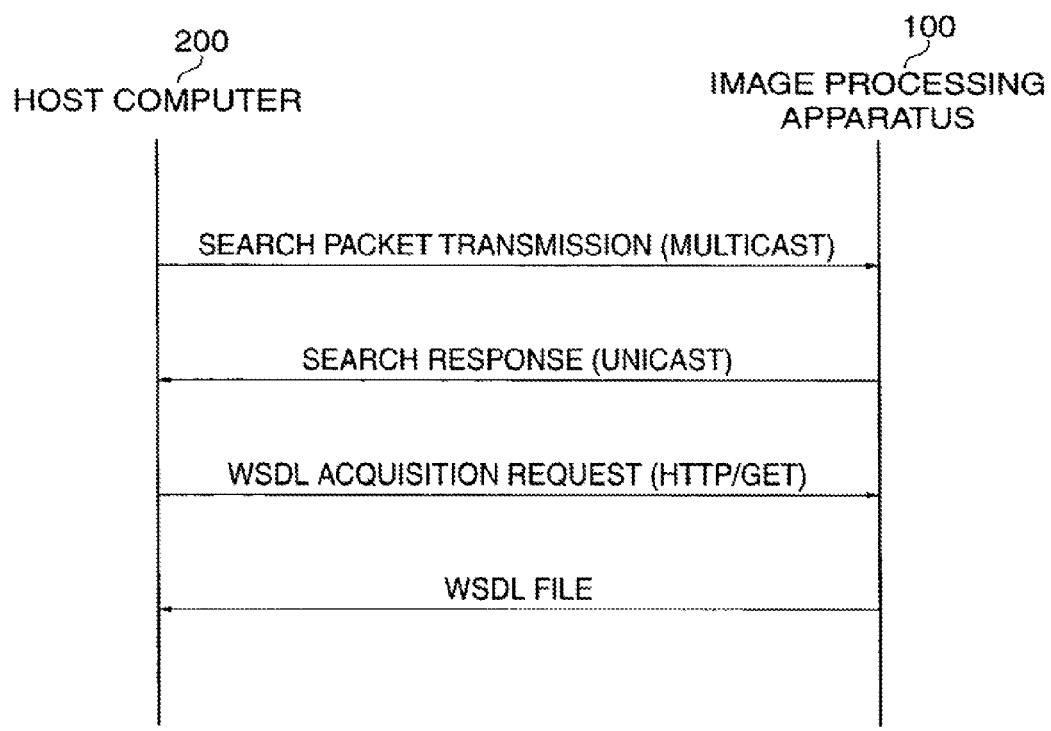
FIG. 9 is a sequence diagram showing an example of a case in which a host computer appearing in FIG. 1 acquires a WSDL file.

FIG. 9 is a sequence diagram showing an example of a case in which the host computer 200 acquires a WSDL file. In this example, the host computer 200 acquires the WSDL file directly from the image processing apparatus 100.

As shown in FIG. 9, first, to search the image processing apparatus 100, the host computer 200 multicasts a search packet over the network 10. FIG. 10 is a diagram showing an example of the search packet in FIG. 9. All image processing apparatuses 100 which are monitoring a predetermined multicast address receive this packet, after which the image processing apparatuses 100 send back to the host computer 200 a search reply packet in unicast mode. FIG. 11 shows an example of the search response packet in FIG. 9.

By receiving the search response packets from all the image processing apparatuses 100 that have received the search response packet, the host computer 200 can acquire a list of printers on the network 10. Further, a Location header that indicates a URL used for acquisition of the WSDL file generated/published on the network by the device is included in the search response packet. The host computer 200 transmits a WSDL file acquisition request to the URL using HTTP/GET, to acquire the WSDL file from an image processing apparatus 100.

Figure 12:
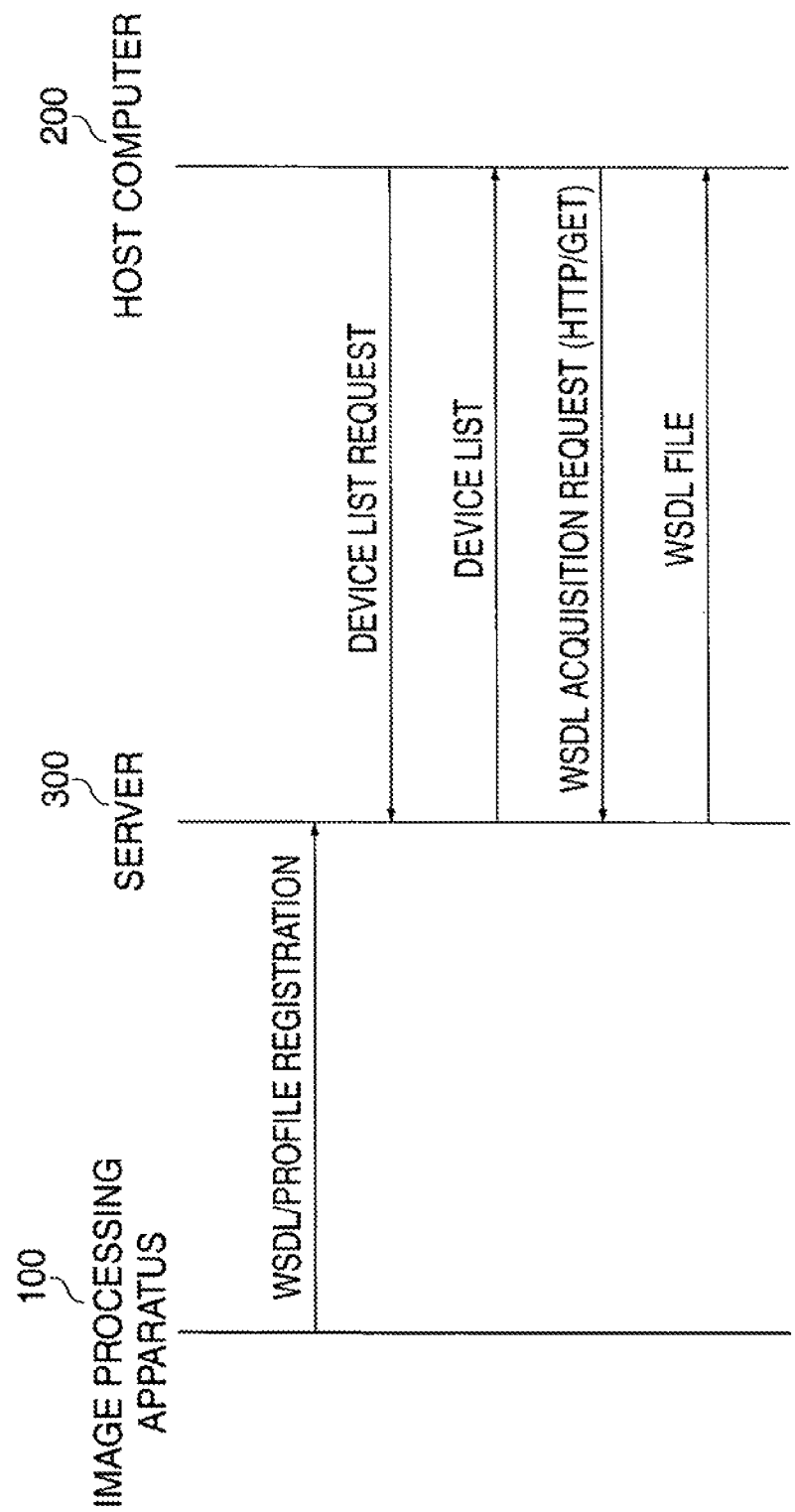
FIG. 12 is a sequence diagram showing another example of a case in which the host computer in FIG. 1 acquires a WSDL file.

FIG. 12 is a sequence diagram showing another example of a case in which the host computer 200 in FIG. 1 acquires a WSDL file. In this example, the host computer 200 acquires the WSDL file through the server 300.

As shown in FIG. 12, the image processing apparatus 100 transmits to the server 300 a generated WSDL file together with profile information (such as name and location of the image processing apparatus 100) to register the information in the server 300. The server 300 stores the WSDL file received from the image processing apparatus 100 and at the same time creates a device entry from the profile information and adds the device entry to a device list. FIG. 13 is a diagram showing an example of the device list that the server 300 in FIG. 1 creates. Information between one <device> and the next </device> is information pertaining to a single device. The information pertaining to a device contains a device ID, device name, the installed location of the device, and URL for acquiring the device WSDL file. A device entry is added each time information from an image processing apparatus 100 on the network 10 is registered to enable integrated management of the devices.

Next, when the host computer 200 transmits a device list request to the server 300 in order to acquire the device list, the server 300 sends back to the host computer 200 the device list it stores at that time. Each device entry contains a <wsdl> tag indicating the URL for acquiring a WSDL file registered by the image processing apparatus 100. By transmitting a WSDL acquisition request to that URL using HTTP/GET, the host computer 200 acquires the WSDL file from the image processing apparatus 100.

Next, as an example of a usage of a WSDL file, a description will be given of a process for analyzing a WSDL file after the host computer 200 has acquired the WSDL file and generating a GUI for accessing the image processing apparatus 100.

Figure 14:
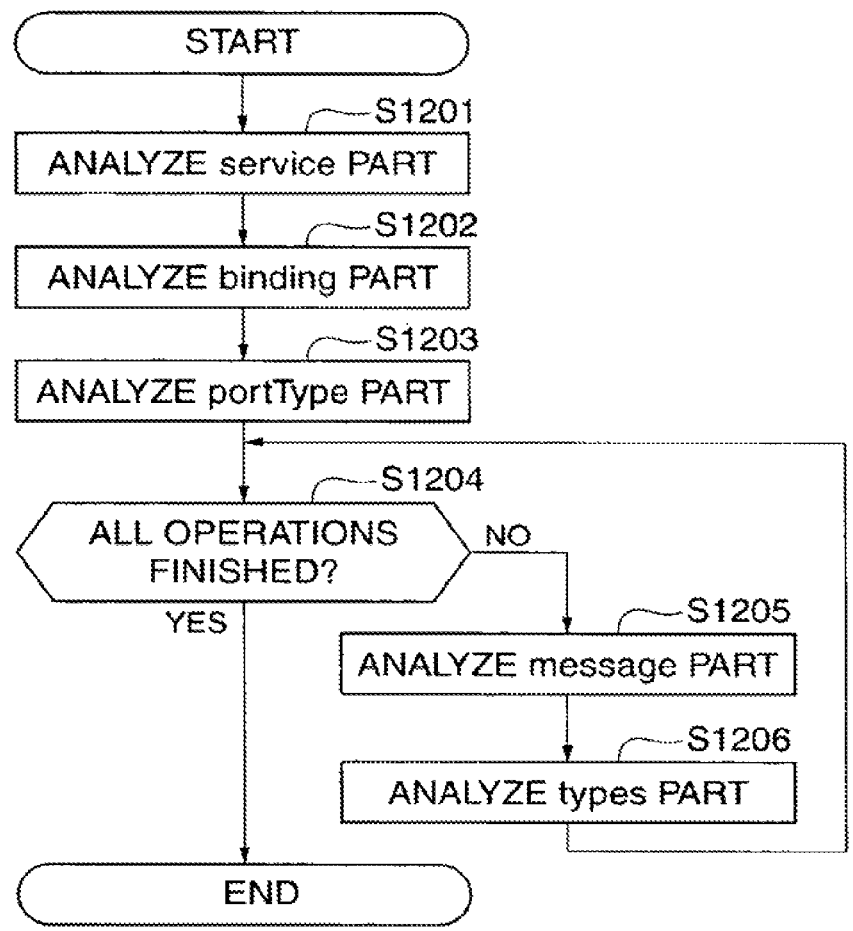
FIG. 14 is a flow chart showing an analysis process for a WSDL file acquired by the host computer in FIG. 1.

FIG. 14 is a flow chart showing an analysis of a WSDL file acquired by the host computer 200.

When the host computer 200 receives a WSDL file, first, in a step S1201, the service part 605 is analyzed. The name of a service described in the WSDL as well as a port for access and associated binding information are described in the service part 605. Next, in a step S1202, the binding part 604 is analyzed. Details of the binding information described in the service part 605 are described in the binding part 604.

Next, in a step S1203, the portType part 603 is analyzed. The name(s) of operation(s) that the service provides and the names of messages exchanged in each of the operations are described in the portType part 603. A plurality of operations may exist, and the following processes are carried out on each of the operations acquired by the analysis in the step S1203.

In a step S1204, it is determined whether or not processing of all the operations is completed. If processing of all the operations is completed, the WSDL analysis process is terminated.

If the result of the determination made in the step S1204 indicates that processing of all the operations has not been completed, that is, if there is an incompletely processed operation, then in a step S1205 the message part 602 is analyzed. Message information exchanged in the operations is described in the message part 602.

Next, in a step S1206, the types part 601 is analyzed. Data type definitions used by the service and based on XML Schema specifications drawn up by W3C are described in the types part 601. In the analysis process of the step S1206, the name and type of arguments used in the operations are acquired and used in a GUI generating process, described below. When the WSDL file analysis process is completed, operation list information is obtained. After completion of the analysis process of the step S1206, the process returns to the step S1204 and when processing of all the operations is completed (that is, YES in the step S1204), the WSDL analysis process is terminated.

FIG. 15 is a diagram showing an example of the operation list information obtained as a result of the WSDL analysis process in FIG. 14. In FIG. 15, only examples of a PrintJob operation and a PauseJob operation are shown. In FIG. 15, arguments that can be designated for the operations are listed. By analyzing the WSDL file, the host computer 200 can identify operations which are carried out by the image processing apparatus 100 and the arguments that can be designated by the respective operations.

Next, a description will be given of the process in which the host computer 200 generates a GUI from the operation list information in FIG. 15.

Figure 16:
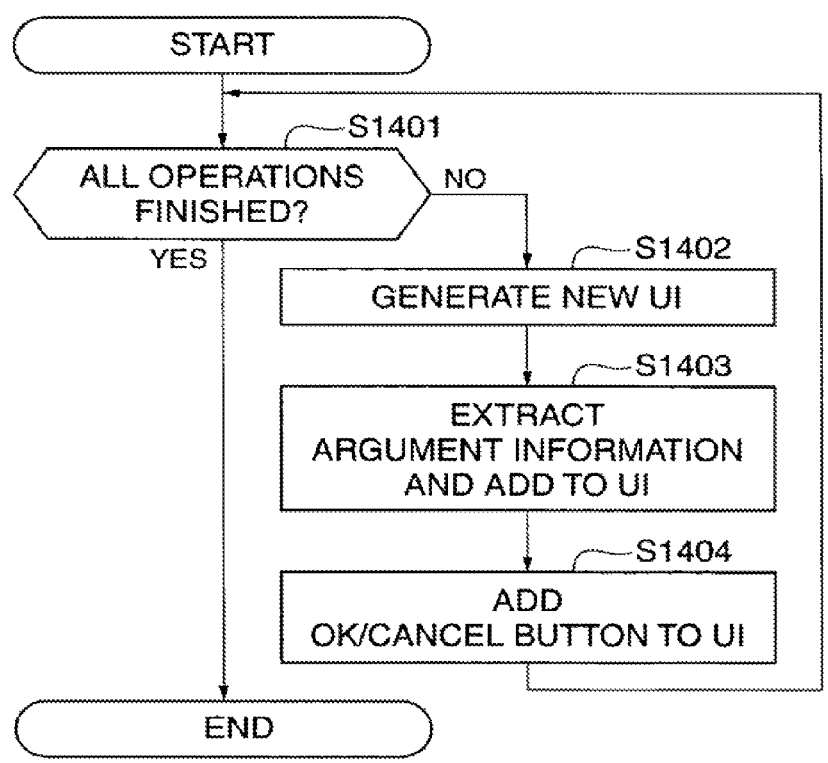
FIG. 16 is a flow chart showing a GUI generating process, in which the host computer generates a GUI from the operation list information.

FIG. 16 is a flow chart showing the GUI generating process, in which the host computer 200 generates a GUI from the operation list information in FIG. 15.

Figure 17:
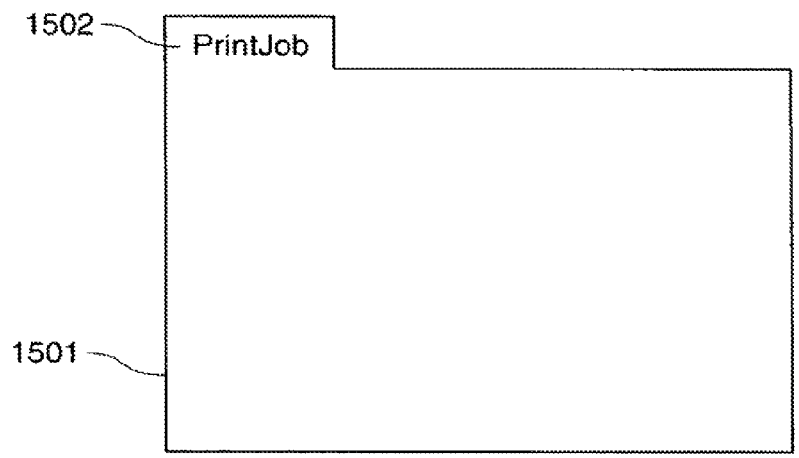
FIG. 17 is a diagram showing an example of a newly generated UI screen.
Figure 18:
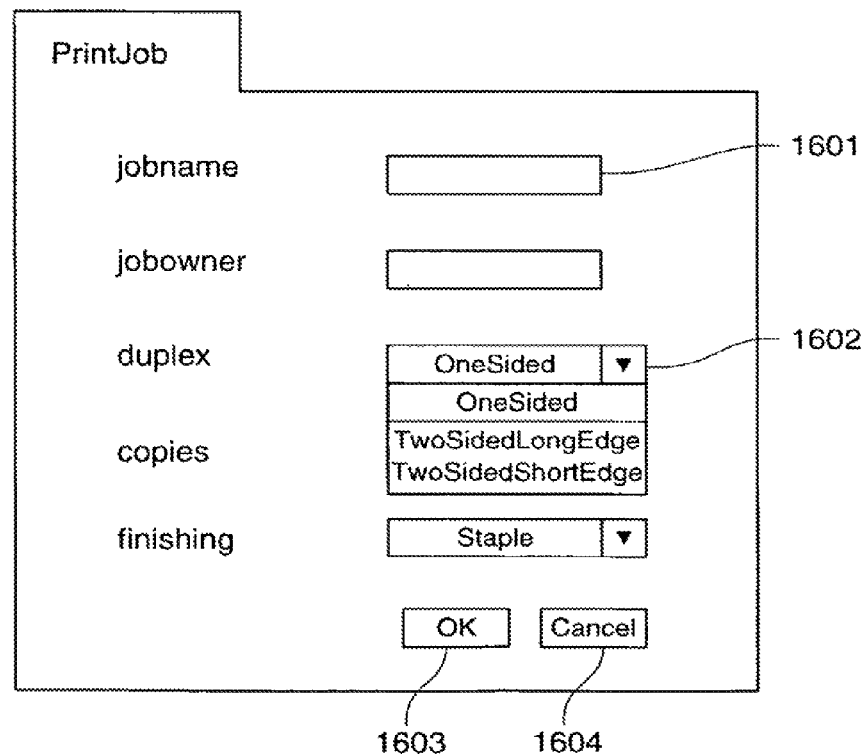
FIG. 18 is a diagram showing an example of a subsequently generated UI screen.

First, in a step S1401, it is determined whether or not all the operations have been processed. If not all the operations have been processed, then the process proceeds to a step S1402, wherein, as shown in FIG. 17, a client UI screen 1501 showing the name of a new operation in a tab part 1502 thereof is generated for the new operation. Then, in a step S1403, information is taken one item at a time from the argument list and added to the generated client UI screen 1501. At this time, if the argument is a string type or an int type, the user can input text values as desired as shown by reference numeral 1601 in FIG. 18, whereas, if the argument is a Duplex type or the like in which the argument is to be newly defined and for which a stipulated character string is to be designated, a desired one of stipulated character strings can be selected in a list box format from a pull-down menu, as shown by reference numeral 1602. After all the argument information has been added, an OK button 1603 and a Cancel button 1604 are added in a step S1404 and the process returns to the step S1401. In the step S1401, if processing of all the operations is completed, the GUI generating process is terminated.

Figure 19:
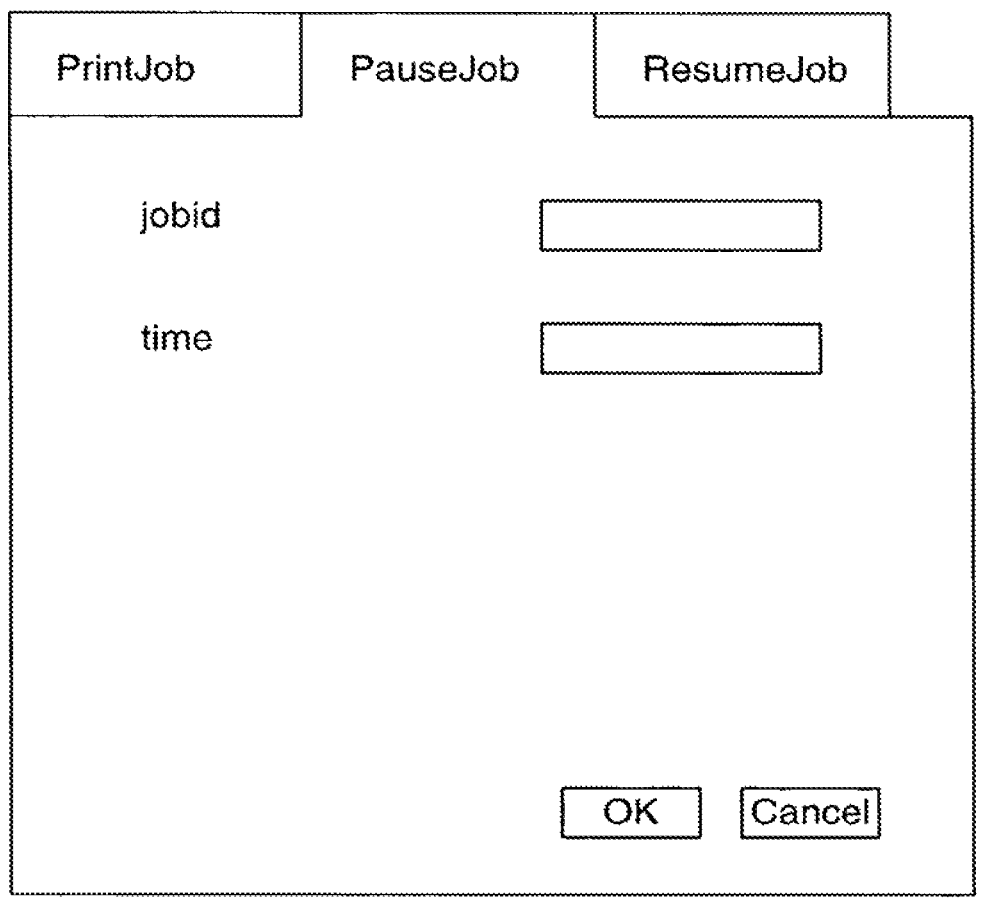
FIG. 19 is a diagram showing an example of a case in which a plurality of UI screens is superposed one upon another.

It should be noted that the client UI screens for the respective operations generated here can be stacked as shown in FIG. 19. When the user selects the tab part, the corresponding operation screen is displayed.

As described above with reference to the foregoing processing flow, when a duplex processor 192 is installed in the image processing apparatus 100, the Duplex designation can be selected from among "One Sided", "Two Sided Long Edge" and "Two Sided Short Edge" from the pull-down menu, but when no duplex processor is installed, only "One Sided" can be selected from the pull-down menu and the user cannot designate two-sided printing. Moreover, when a hard disk is installed in the image processing apparatus 100, Pause Job/Resume Job client UI screens are displayed. By contrast, in the case where the external storage device 141 is not installed in the image processing apparatus 100, the corresponding screens are not displayed and the user knows that the image processing apparatus 100 does not support the Pause Job/Resume Job operations.

Although in the foregoing embodiment, a WSDL file is generated only once when the printer is activated, alternatively, the system may be configured so as to await a timer, regenerating a WSDL file at uniform time intervals and updating the WSDL file. Moreover, in the case of the occurrence of an event that requires a change in the WSDL file without re-supplying the power, such as when a paper tray is changed, the system may be configured such that a WSDL file is regenerated and the WSDL file is updated, upon the occurrence of each such event.

As described above, according to the present embodiment, by reflecting in the WSDL file information that dynamically changes, such as equipment information, it is possible to provide a data processing apparatus that enables the publishing of only interface information on operations that can actually be executed.

It is to be understood that the object of the present invention may also be accomplished by supplying a system or an apparatus with a storage medium (or a recording medium) in which a software program code which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An image processing apparatus comprising: a communication unit configured to communicate with a computer; a printer configured to print an image based on print data received from the computer by the communication unit;

a connection unit configured to connect an optional device to the image processing apparatus to perform a function which is added to the image processing apparatus; and
a controller configured to:
    determine whether or not the optional device is connected to the image processing apparatus; and
    control the communication unit to transmit, in a case where the optional device is determined to be connected to the image processing apparatus, a character string, indicating the function, to be displayed as one of a plurality of candidates which are to be subjected to a user's selection through the computer, in response to a request received from the computer by the communication unit,
wherein each of said units is implemented at least by computer hardware.

2. The image processing apparatus according to claim 1, wherein the function comprises stapling.

3. The image processing apparatus according to claim 1, wherein the function comprises sorting.

4. The image processing according to claim 1, wherein the function comprises a long edge binding or a short edge binding.

5. The image processing according to claim 1, wherein the function comprises pausing or resuming a job.

6. The image processing apparatus according to claim 1, wherein the controller controls the communication unit not to transmit, in a case where the optional device is not connected to the image processing apparatus, the character string in response to the request received from the computer by the communication unit.

7. The image processing apparatus according to claim 1, wherein the request is selected for acquiring a file, and wherein the controller controls the communication unit to transmit a file including the character string in response to the request.

8. The image processing apparatus according to claim 7, wherein the file is described in markup language.

9. The image processing apparatus according to claim 7, wherein the file is described in WSDL.

10. The image processing apparatus according to claim 1, wherein the optional device comprises a finisher.

11. The image processing apparatus according to claim 1, wherein the optional device comprises a duplex processor.

12. The image processing apparatus according to claim 1, wherein the optional device comprises an external storage device.

13. The image processing apparatus according to claim 1, wherein the optional device performs the function in a case where the character string is selected by the user through the computer.

14. A data processing method of an image processing apparatus having a communication unit configured to communicate with a computer, comprising: a printing step of printing an image based on print data received from the computer by the communication unit; a determining step of determining whether or not an optional device is connected to the image processing apparatus to perform a function which is added to the image processing apparatus; and a transmitting step of transmitting, in a case where the optional device is determined to be connected to the image processing apparatus in the determining step, a character string to be displayed as one of a plurality of function candidates which a user selects through the computer, in response to a request received from the computer by the communication unit.

15. The data processing method according to claim 14, wherein the function comprises stapling.

16. The data processing method according to claim 14, wherein the function comprises sorting.

17. The data processing method according to claim 14, wherein the function comprises a long edge binding or a short edge binding.

18. The data processing method according to claim 14, wherein the function comprises pausing or resuming a job.

19. The data processing method according to claim 14, wherein, in the transmitting step, the communication unit does not transmit, in a case where the optional device is not connected to the image processing apparatus, the character string in response to the request received from the computer by the communication unit.

20. The data processing method according to claim 14,
    wherein the request is selected for acquiring a file, and
    wherein, in the transmitting step, the communication unit transmits a file including the character string in response to the request.

21. The data processing method according to claim 20, wherein the file is described in a markup language.

22. The data processing method according to claim 20, wherein the file is described in WSDL.

23. The data processing method according to claim 14, wherein the optional device comprises a finisher.

24. The data processing method according to claim 14, wherein the optional device comprises a duplex processor.

25. The data processing method according to claim 14, wherein the optional device comprises an external storage device.

26. The data processing method according to claim 14, wherein the optional device performs the function in a case where the character string is selected by the user through the computer.

27. A non-transitory computer readable storage medium encoded with a data processing program for causing an image processing apparatus having a communication unit configured to communicate with a computer to execute a data processing method, the method comprising: a printing step of printing an image based on print data received from the computer by the communication unit; a determining step of determining whether or not an optional device is connected to the image processing apparatus to perform a function which is added to the image processing apparatus; and a transmitting step of transmitting, in a case where the optional device is determined to be connected to the image processing apparatus in the determining step, a character string to be displayed as one of a plurality of function candidates which a user selects through the computer, in response to a request received from the computer by the communication unit.

28. A computer capable of communicating with an image processing apparatus, the computer comprising:
    a communication unit configured to communicate with the image processing apparatus;
    a display unit; and a controller configured to:
        control the communication unit to transmit print data to the image processing apparatus for printing an image based on the print data;
        control the communication unit to transmit a request to the image processing apparatus; control the communication unit to receive, in response to the request, and in a case where an optional device is connected to the image processing apparatus to perform a function which is added to the image processing apparatus, a character string to be displayed as one of a plurality of function candidates which a user selects through the computer; and
        control the display unit to display the character string, wherein each of said units is implemented at least by computer hardware.

29. The computer according to claim 28, wherein the function comprises stapling.

30. The computer according to claim 28, wherein the function comprises sorting.

31. The computer according to claim 28, wherein the function comprises a long edge binding or a short edge binding.

32. The computer according to claim 28, wherein the function comprises pausing or resuming a job.

33. The computer according to claim 28, wherein the optional device comprises a finisher.

34. The computer according to claim 28, wherein the optional device comprises a duplex processor.

35. The computer according to claim 29, wherein the optional device comprises an external storage device.

36. The computer according to claim 29, wherein the optional device is configured to perform the function in a case where the character string is selected by the user through the display unit.

37. The image processing apparatus according to claim 1, wherein the controller controls the communication unit to transmit, in a case where the optional device is not connected to the image processing apparatus, a second character string to be displayed as one of a plurality of candidates which are to be subjected to a user's selection through the computer, the second character string indicating that input of a print job is possible.

38. The image processing apparatus according to claim 37, wherein the controller controls the communication unit to transmit, in a case where the optional device is determined to be connected to the image processing apparatus, the character string and the second character string.

* * * * *